United States Patent [19]

Makino et al.

[11] Patent Number: 4,791,170

[45] Date of Patent: Dec. 13, 1988

[54] RUBBER COMPOSITIONS

[75] Inventors: Masaharu Makino; Hisatake Satoh, both of Yokohama, Japan

[73] Assignee: Nippon Oil Co., Ltd., Tokyo, Japan

[21] Appl. No.: 149,836

[22] Filed: Jan. 29, 1988

[30] Foreign Application Priority Data

Feb. 3, 1987 [JP] Japan .................................. 62-22791

[51] Int. Cl.⁴ ...................... C08L 71/04; C08L 57/02; C08F 8/00
[52] U.S. Cl. .................................... 525/54.5; 524/65; 524/323; 524/499; 525/132
[58] Field of Search ............... 525/54.5, 132; 524/323, 524/65, 499

[56] References Cited

U.S. PATENT DOCUMENTS 4,385,141 5/1983 Agarwai et al. .................... 525/54.5
4,440,816 4/1984 Uffner ................................ 525/54.5

FOREIGN PATENT DOCUMENTS 46-21897 6/1971 Japan .
87555 7/1976 Japan .
2092601 8/1982 United Kingdom ............... 525/54.5

OTHER PUBLICATIONS

Derwent Abs. 78-88090 A/49 Mitsui Petro Sakashita (DE 2821301) (11-30-78).

Primary Examiner—Herbert J. Lilling
Attorney, Agent, or Firm—Bruce L. Adams; Van C. Wilks

[57] ABSTRACT

Rubber compositions are disclosed which essentially comprise ethylene/alpha-olefin rubbers and specified amounts of a selected class of aromatic hydrocarbon resins containing a phenolic hydroxyl group and having specified hydroxyl numbers and softening points. The composition is highly roll-retentive and sufficiently tacky in an unvulvcanized state with vulcanization speed and vulcanizate quality held at an optimum level.

9 Claims, No Drawings

RUBBER COMPOSITIONS

BACKGROUND OF THE INVENTION

1. Field of the Invention

This invention relates to rubber compositions and more particularly to such a composition having improved processability and quality characteristics prior to and after vulcanization.

2. Description of the Prior Art

Ethylene/alpha-olefin rubbers, sometimes including an unconjugated diene or dienes, are usually called "EP" type rubbers and known for their great ozon resistance, high weather-proofness and superior thermal stability. Such rubbers find extensive application to automotive parts, building components, industrial rubber products and the like. EP rubbers, however, are not totally satisfactory with respect to roll retention and also to tackiness in an unvulcanized state, leading to processing inconveniences.

By the term roll retention is meant the ability of an EP rubber to adhere to the surface of a roll mill while being blended with additives. Insufficient roll retention literally entails increased labor and time in the blending.

Tackiness is an adhesive property by which a rubber in bonded to a rubber or to a different material under pressure. For instance, automotive tires or tubes are generally formed by joining rubber/rubber laminates into a desired shape which is subsequently vulcanized. Laminates of less tacky, unvulcanized rubbers are difficult to vulcanize while retaining the predetermined shape, the resulting vulcanizate being susceptible to delamination.

To cope with this problem, a variety of tackifying agents have been proposed but with no appreciable success. Cumarone resins, terpene resins and aliphatic petroleum resins known in common use as tackifiers are inadequate in tack strength. Extender oils if added in large amounts may improve tackiness to some extent, but would often render the vulcanizate physically weak. There is still much to be desired despite many attempts made with certain other types of tackifiers as disclosed for instance in Japanese Patent Publication No. 46-21897 and Japanese Patent Laid-Open Publication No. 51-87555.

SUMMARY OF THE INVENTION

It is therefore the primary object of the present invention to provide an improved rubber composition which will exhibit excellent roll retention, high tackiness and good after-mold properties.

The rubber composition according to the invention contemplates the use of a selected class of aromatic hydrocarbon resins combined with EP rubbers.

More specifically, such composition comprises (a) a starting rubber comprising ethylene and an alpha-olefin, and (b) an aromatic hydrocarbon resin containing a phenolic hydroxyl group and having a hydroxyl number of 30–150 and a softening point of 50°–180° C., the hydrocarbon resin being present in an amount of 0.5–30 parts by weight based on 100 parts by weight of the starting rubber.

DETAILED DESCRIPTION OF THE INVENTION

Starting rubbers useful for the purpose of the present invention include rubbery polymers resulting from copolymerization of ethylene with an alpha-olefin, or from terpolymerization of the two monomers with an unconjugated diene, in the presence of a known Ziegler-Natta type catalyst.

Specific examples of copolymerizable alpha-olefins include alpha-olefins having a carbon number of 3–5 and including propylene, 1-butene, 1-pentene and the like. Propylene is particularly preferred.

Eligible diene comonomers may be selected from dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyl-trans-1,2-divinylcyclobutane, 1,4-hexadiene, 2-methyl-1,4-hexadiene, 1,6-octadiene, 1,7-octadiene, 1,8-nonadiene, 1,9-decadiene, 3,6-dimethyl-1,7-octadiene, 4,5-dimethyl-1,7-octadiene, 1,4,7-octatriene, 5-methyl-1,8-nonadiene and the like. These dienes may be used alone or in combination. Particularly preferred are 5-ethylidene-2-norbornene, dicyclopentadiene and their combination.

The molar ratio of ethylene to alpha-olefin is 50–80%:50–20% in the copolymer rubber eligible in the invention. Where a terpolymer rubber is used, the ethylene to alpha-olefin to diene ratio is 49–70%:50–20%:1–10%. The starting rubber so composed should have a Mooney viscosity $[ML_{1+4}(100°\ C.)]$ of not smaller than 20, preferably larger than 50.

An important feature of the invention resides in blending starting rubbers with a selected class of aromatic hydrocarbon resins having hydroxyl numbers and softening points latter described. This resin contains a phenolic hydroxyl group and has an unsaturated aromatic hydrocarbon chemically bonded as a repeating unit generally in an amount exceeding 50%, preferably greater than 80%. Eligible hydrocarbon resins may be derived for instance by copolymerizing a phenol with an unsaturated aromatic hydrocarbon usually of 8–10 carbon atoms, or by copolymerizing such phenol and hydrocarbon compounds with another unsaturated hydrocarbon usually of 4–20 carbon atoms. In the second reaction, the last-named hydrocarbon is of an aliphatic type with carbon-carbon double bonds and in a limited amount less than 50% by weight of the first-named aromatic hydrocarbon.

Most typically, such hydrocarbon resin is obtainable from copolymerization of an aromatic petroleum or coal fraction distilling at from 140° to 240° C. with a phenol in the presence of a Friedel-Crafts type catalyst. The resulting copolymer is conveniently post-treated to decompose the catalyst and to remove unreacted oils and low-molecular polymers, whereby a pure hydrocarbon resin is provided.

Examples of the aromatic petroleum fraction include cracked gas oils produced upon thermal cracking of naphtha, kerosine, light gas oil and the like, whereas the aromatic coal fraction include for example coke-oven heavy gas oils. Contained in each such fraction are aromatic olefins of 8–10 carbon atoms, such as styrene, alkylstyrenes, indene, alkylindenes and cumarone, usually in an amount of 90% by weight of all unsaturated hydrocarbons. The oil fraction, whether from either petroleum or coal, may be admixed with a cracked oil cut boiling at from −20° to +100° C. and containing an unsaturated aliphatic hydrocarbon in which instance the aromatic hydrocarbon content should not be less than 50%, preferably more than 80% by weight of all unsaturated hydrocarbons.

Eligible phenols include for example phenol, cresol, xylenol, t-butyl phenol, nonyl phenol and the like, and combinations thereof. The amount of the phenol to be used should be determined such that the hydroxyl number of the final hydrocarbon resin is in the range of 30-150. To this end, the phenol may suitably be incorporated in amounts of 5-40 parts, preferably 10-30 parts per 100 parts by weight of the oil fraction.

The oil fraction is allowed to copolymerize with a given phenol with use of a Friedel-Crafts type catalyst selected for example from boron trifluoride, aluminum chloride, boron trifluoride/phenol complexes, boron trifluoride/dialkyl ether complexes and the like. The catalyst ranges in amount from 0.05 to 5% by weight, preferably from 0.1 to 3% by weight. Reaction is effected at a temperature between $-10°$ and $+80°$ C. for from about 10 minutes to 5 hours. The reaction mixture is treated with an alkaline compound such as sodium hydroxide or sodium carbonate to thereby decompose the catalyst, followed by evaporation or distillation of unreacted oils and low polymers.

The hydrocarbon resin used herein should have a hydroxyl number of 30-150, preferably 40-140, and a softening point of 50°-180° C., preferably 60°-160° C. The resin if smaller hydroxyl numbers than 30 would be ineffective for improving roll retention and tack strength and if larger hydroxyl numbers than 150, though sufficient in these qualities, would make the resulting composition objectionably colorable and less productive. Lower softening points than 50° C. would cause the resin to be highly susceptible to blocking and hence difficult to knead, producing a vulcanized rubber of inadequate tensile stress and other necessary qualities. Higher softening points than 180° C. would invite insufficient dispersion of the resin in the starting rubber.

The amount of the hydrocarbon resin to be added should be in the range of 0.5-30 parts, preferably 2-20 parts per 100 parts by weight of the starting rubber. Smaller amounts than 0.5 parts would fail to develop roll retention and tackiness. Larger amounts than 30 parts would lead to reduced vulcanization speed and thus result in deteriorated vulcanizate quality.

Various other additives may be employed which include reinforcing fillers, vulcanizing agents, vulcanizing accelerators, vulcanizing promoters, softeners, antioxidants and the like. Known tackifiers such as cumarone resins, terpene resins and phenol resins may be added but in amounts not beyond the specified hydrocarbon resin range and also in amounts smaller than 30 parts, in a hydrocarbon resin plus tackifier sum, per 100 parts by weight of the starting rubber.

There may also be used co-rubbers such as natural rubber, styrene/butadiene rubber, butyl rubber, butadiene/acrylonitrile rubber and similar rubbers, their amount being not more than equivalent starting rubber. Too much co-rubber is liable to adversely affect the weathering and thermal resistance peculiar to the starting rubber.

The rubber composition of the invention may be produced by mechanical blending of a given starting rubber with a selected hydrocarbon resin and also with additives with use of a roll mill or a Banbury mixer.

The following examples are given to further illustrate the present invention, but should not be construed as limiting the invention. All parts are by weight in these examples.

Preparation of Hydrocarbon Resins (1) To 100 parts of an oil fraction produced upon steam cracking of naphtha and having a boiling point of 145°-190° C. and an unsaturated components content of 60 wt. % were added 15 parts of phenol and 0.6 part of a boron trifluoride/phenol complex catalyst. The mixture was copolymerized at 60° C. for 3 hours after which the catalyst was decomposed with aqueous sodium hydroxide. The copolymer was washed with water and then vacuum-distilled to remove unreacted oils and low polymers to thereby provide a hydrocarbon resin according to the invention, i.e. Resin A having a hydroxyl number of 70 and a softening point of 90° C.

(2) Coal tar was distilled to collect an oil fraction having a boiling point of 176°-196° C. The resulting oil fraction contained 54% of indene and methylindene, 6.8% of cumarone and 7.6% of other unsaturated components.

Two 100-part portions of the oil fraction were admixed with 15 parts and 25 parts, respectively, of commercially available cresylic acid composed of 30% of phenol, 10% of o-cresol, 25% of m-cresol, 15% of p-cresol and 10% of xylenol, and 0.6 part of a boron trifluoride/phenol complex. Copolymerization was effected at 60° C. for 2 hours. The resulting copolymers were treated in a manner similar to procedure (1) above, thereby providing Resin B and Resin C. Resin B showed a hydroxyl number of 75 and a softening point of 115° C., and Resin C were 116 and 93° C. in the same properties.

(3) In 100 parts of the same oil fraction as used in procedure (1) were incorporated 1.5 parts of phenol and 0.6 part of a similar catalyst, followed by copolymerization of the mixture and by subsequent treatment of the copolymerizate in a similar manner. There was obtained a comparative hydrocarbon resin having a hydroxyl number of 10 and a softening point of 100° C. and labeled Resin D.

EXAMPLES 1-3 AND COMPARATIVE EXAMPLES 1-5

Different rubber compositions were formulated and produced as tabulated. All these compositions were kneaded at 120° C. into unvulcanized rubber sheets.

Roll retention, tack strength, vulcanization speed, hardness, 300% modulus and thermal stability were examined under the conditions given below and with the results tabulated.

Roll Retention

Adhesion of the composition onto a roll mill was visually inspected while in kneading. Roll retention was graded as follows:
x: bad
Δ: poor
o: good Tack Strength Measurement was made under conditions of temperature: 25° C., load: 500 g, contact time: 30 seconds and peel speed: 100 mm/minute with use of a tester tradenamed Picmatack Tester, Toyo Seiki Seisakusho, Ltd.

Vulcanization Speed

A tester tradenamed Oscillating Disc Rheometer, Toyo Seiki Seisakusho, Ltd. was used at a vulcanization temperature of 160° C. Speed was determined by the difference between $t_{10}$ and $t_{90}$:

$t_{10}$: time required for maximum torque to reach 10% (second)

$t_{90}$: time required for maximum torque to reach 90% (second)

Hardness

Shore A hardness was measured in accordance with JIS K-6301.

300% Modulus

JIS K-6301 was followed using No. 3 dumbbell.

Thermal Stability

The vulcanizate was disposed at 150° C. for 3 days after which 300% modulus was measured. Stability was determined in terms of the ratio of moduli at 300% prior to and after heating.

The rubber compositions according to the invention, Examples 1–3, have proved highly satisfactory in respect of all the physical characteristics tested.

The use of a hydrocarbon resin departing from the specified ranges of hydroxyl numbers and softening points showed a sharp decline in roll retention and tackiness as evidenced by Comparative Example 1. Known tackifiers, Comparative Examples 2–4, produced similar adverse results. A control in which neither a hydrocarbon resin nor a tackifier was added, Comparative Example 5, was unacceptably roll-retentive.

It will be apparent to those skilled in the art that the invention has been described with reference to exemplary embodiments and that changes and modifications may be made without departing from the scope of the appended claims.

TABLE

| Formulations (part by weight) | Examples | | | Comparative Examples | | | | |
|---|---|---|---|---|---|---|---|---|
| | 1 | 2 | 3 | 1 | 2 | 3 | 4 | 5 |
| EP rubber*1 | 140 | 140 | 140 | 140 | 140 | 140 | 140 | 140 |
| carbon black*2 | 100 | 100 | 100 | 100 | 100 | 100 | 100 | 100 |
| zinc oxide | 3 | 3 | 3 | 3 | 3 | 3 | 3 | 3 |
| stearic acid | 2 | 2 | 2 | 2 | 2 | 2 | 2 | 2 |
| sulfur | 2.8 | 2.8 | 2.8 | 2.8 | 2.8 | 2.8 | 2.8 | 2.8 |
| Nocceller-CZ*3 | 4 | 4 | 4 | 4 | 4 | 4 | 4 | 4 |
| Nocceller-TT*3 | 5 | 5 | 5 | 5 | 5 | 5 | 5 | 5 |
| process oil*4 | 60 | 60 | 60 | 60 | 60 | 60 | 60 | 60 |
| Resin A | 10 | | | | | | | |
| Resin B | | 10 | | | | | | |
| Resin C | | | 10 | | | | | |
| Resin D | | | | 10 | | | | |
| control resin a*5 | | | | | 10 | | | |
| control resin b*6 | | | | | | 10 | | |
| control resin c*7 | | | | | | | 10 | |
| roll retention | o | o | o | Δ | Δ | Δ | Δ | x |
| tack strength (g/13 mm) | 1100 | 970 | 1210 | 470 | 460 | 680 | 670 | 440 |
| vulcanization speed (sec) | 260 | 255 | 265 | 275 | 280 | 290 | 285 | 270 |
| hardness | 60 | 60 | 61.5 | 59.5 | 59.0 | 59.5 | 59.5 | 61.5 |
| 300% modulus (kg/cm²) | 80 | 79 | 81 | 73 | 70 | 72 | 73 | 82 |
| thermal stability (%) | 96 | 96 | 97 | 88 | 88 | 90 | 91 | 98 |

Notes:
*1EPT-3072E, Mitsui Petrochemical Industries, Ltd.
*2Asahi Carbon No. 60, Asahi Carbon Co., Ltd.
*3vulcanizing accelerator, Ohuchi Shinko Chemical Industries, Ltd.
*4Diana Process Oil PW-38. Idemitsu Kosan Co., Ltd.
*5G-90, cumarone resin, Nittetsu Chemical Industrial Co., Ltd.
*6YS Resin TO-105, terpene resin, Yasuhara Oils and Fats Co., Ltd.
*7Wing-Tack 95, aliphatic resin, Goodyear Tire & Rubber Co.

What is claimed is:

1. A rubber composition comprising:
   (a) a starting rubber comprising ethylene and an alpha-olefin; and
   (b) an aromatic hydrocarbon resin containing a phenolic hydroxyl group and having a hydroxyl number of 30–150 and a softening point of 50°–180° C., said hydrocarbon resin being present in an amount of 0.5–30 parts by weight based on 100 parts by weight of said starting rubber, said hydrocarbon resin being a polymeric material derived from copolymerization of an aromatic petroleum or coal fraction distilling at from 140°–240° C. with a phenol in the presence of an effective catalyst.

2. A rubber composition of claim 1 wherein said catalyst comprises a Fried-Crafts catalyst.

3. A rubber composition of claim 2 wherein said petroleum fraction is a cracked gas oil, and said coal fraction is a coke-oven heavy gas oil.

4. A rubber composition of claim 2 wherein said phenol is phenol, cresol, xylenol, t-butyl phenol or nonyl phenol, or a combination thereof.

5. A rubber composition of claim 2 wherein said catalyst is boron trifluoride, aluminum chloride, a boron trifluoride/phenol complex or a boron trifluoride/dialkyl ether complex.

6. A rubber composition of claim 1 wherein said starting rubber further includes an unconjugated diene.

7. A rubber composition of claim 1 wherein said alpha-olefin is propylene, 1-butene or 1-pentene.

8. A rubber composition of claim 6 wherein said diene is dicyclopentadiene, tricyclopentadiene, 5-methyl-2,5-norbornadiene, 5-methyl-2-norbornene, 5-ethylidene-2-norbornene, 5-isopropylidene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyltrans-1,2-divinylcyclobutane, 1,4-hexadiene, 1,6-octadiene, 1,7-octadiene, 1,8-nonadiene, 1,9-decadiene, 3,6-dimethyl-1,7-octadiene, 4,5-dimethyl-1,7-octadiene, 1,4,7-octatriene or 5-methyl-1,8-nonadiene, or a combination thereof.

9. A rubber composition of claim 3 wherein each of said petroleum and coal fractions further includes a cracked oil cut distilling at from −20° to +100° C.

* * * * *